United States Patent
Elias et al.

(10) Patent No.: US 12,249,315 B2
(45) Date of Patent: *Mar. 11, 2025

(54) UNSUPERVISED PARALLEL TACOTRON NON-AUTOREGRESSIVE AND CONTROLLABLE TEXT-TO-SPEECH

(71) Applicant: Google LLC, Mountain View, CA (US)

(72) Inventors: Isaac Elias, Mountain View, CA (US); Byungha Chun, Tokyo (JP); Jonathan Shen, Mountain View, CA (US); Ye Jia, Mountain View, CA (US); Yu Zhang, Mountain View, CA (US); Yonghui Wu, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,031

(22) Filed: Oct. 31, 2023

(65) Prior Publication Data
US 2024/0062743 A1 Feb. 22, 2024

Related U.S. Application Data

(63) Continuation of application No. 17/326,542, filed on May 21, 2021, now Pat. No. 11,823,656.
(Continued)

(51) Int. Cl.
  *G10L 13/08* (2013.01)
  *G10L 13/04* (2013.01)
(52) U.S. Cl.
  CPC .............. *G10L 13/08* (2013.01); *G10L 13/04* (2013.01)
(58) Field of Classification Search
  None
  See application file for complete search history.

(56) References Cited

U.S. PATENT DOCUMENTS 10,872,598 B2   12/2020   Arik et al.
2018/0336880 A1* 11/2018  Arik .................... G10L 25/30
(Continued)

FOREIGN PATENT DOCUMENTS

JP       202112351 A     2/2021
WO     2019217035 A1    11/2019
(Continued)

OTHER PUBLICATIONS

Peng Liu, Yuewen Cao, Songxiang Liu, Na Hu, Guangzhi Li, Chao Weng, Dan Su "VARA-TTS: Non-Autoregressive Text-to-Speech Synthesis based on Very Deep VAE with Residual Attention" arXiv:2102.06431v1 (Year: 2021).*
(Continued)

*Primary Examiner* — Richemond Dorvil
*Assistant Examiner* — Alexander G Marlow
(74) *Attorney, Agent, or Firm* — Honigman LLP; Brett A. Krueger; Grant Griffith

(57) ABSTRACT

A method for training a non-autoregressive TTS model includes obtaining a sequence representation of an encoded text sequence concatenated with a variational embedding. The method also includes using a duration model network to predict a phoneme duration for each phoneme represented by the encoded text sequence. Based on the predicted phoneme durations, the method also includes learning an interval representation and an auxiliary attention context representation. The method also includes upsampling, using the interval representation and the auxiliary attention context representation, the sequence representation into an upsampled output specifying a number of frames. The method also includes generating, based on the upsampled output, one or more predicted mel-frequency spectrogram sequences for the encoded text sequence. The method also includes determining a final spectrogram loss based on the
(Continued)

predicted mel-frequency spectrogram sequences and a reference mel-frequency spectrogram sequence and training the TTS model based on the final spectrogram loss.

20 Claims, 7 Drawing Sheets

Related U.S. Application Data

(60) Provisional application No. 63/164,503, filed on Mar. 22, 2021.

(56) References Cited

U.S. PATENT DOCUMENTS

| | | |
|---|---|---|
| 2018/0336882 A1 | 11/2018 | Reber et al. |
| 2020/0066253 A1 | 2/2020 | Peng et al. |
| 2020/0074985 A1* | 3/2020 | Clark ............... G10L 25/24 |
| 2022/0165248 A1 | 5/2022 | Sun et al. |

FOREIGN PATENT DOCUMENTS

| | | |
|---|---|---|
| WO | 2020236990 A1 | 11/2020 |
| WO | 2021040989 A1 | 3/2021 |

OTHER PUBLICATIONS

Ashish Vaswani, Noam Shazeer, Niki Parmar, Jakob Uszkoreit, Llion Jones, Aidan N. Gomez, tukasz Kaiser, Illia Polosukhin "Attention Is All You Need" arXiv:1706.03762v5 (Year: 2017).*

Wei-Ning Hsu, Yu Zhang, Ron J. Weiss, Heiga Zen, Yonghui Wu, Yuxuan Wang, Yuan Cao, Ye Jia, Zhifeng Chen, Jonathan Shen, Patrick Nguyen, Ruoming Pang "Hierarchical Generative Modeling for Controllable Speech Synthesis" arXiv :1810.07217v2 (Year: 2018).*

Guangzhi Sun, Yu Zhang, Ron J. Weiss, Yuan Cao, Heiga Zen, Andrew Rosenberg, Bhuvana Ramabhadran, Yonghui Wu "Generating Diverse and Natural Text-To-Speech Samples Using a Quantized Fine-Grained VAE and Autoregressive Prosody Prior" arXiv:2002.03788v1 (Year: 2020).*

Felix Wu, Angela Fan, Alexei Baevski, Yann N. Dauphin, Michael Auli "Pay Less Attention With Lightweight and Dynamic Convolutions" arXiv:1901.10430v2 (Year: 2019).*

Dan Lim, Won Jang, Gyeonghwan O, Heayoung Park, Bongwan Kim, Jaesam Yoon "JDI-T: Jointly trained Duration Informed Transformer for Text-To-Speech without Explicit Alignment" arXiv:2005.07799v3 (Year: 2020).*

Yi Ren, Yangjun Ruan, Xu Tan, Tao Qin, Sheng Zhao, Zhou Zhao, Tie-Yan Liu "FastSpeech: Fast, Robust and Controllable Text to Speech" arXiv:1905.09263v5 (Year: 2019).*

Z. Zhang, S. Wu, G. Chen and D. Jiang, "Self-Attention and Dynamic Convolution Hybrid Model for Neural Machine Translation," 2020 IEEE International Conference on Knowledge Graph (ICKG), Nanjing, China, 2020, pp. 352-359, doi: 10.1109/ ICBK50248.2020.00057. (Year: 2020).

Isaac Elias, Heiga Zen, Jonathan Shen, Yu Zhang, Ye Jia, RJ Skerry-Ryan, Yonghui Wu "Parallel Tacotron 2: A Non-Autoregressive Neural TTS Model with Differentiable Duration Modeling" arXiv:2103.14574v7 (Year: 2021).

Office Action issued in related Japanese Patent Application No. 2023-558226, dated Jan. 21, 2025.

* cited by examiner

UNSUPERVISED PARALLEL TACOTRON NON-AUTOREGRESSIVE AND CONTROLLABLE TEXT-TO-SPEECH

CROSS REFERENCE TO RELATED APPLICATIONS

This U.S. patent application is a continuation of, and claims priority under 35 U.S.C. § 120 from, U.S. patent application Ser. No. 17/326,542, filed on May 21, 2021, which claims priority under 35 U.S.C. § 119(e) to U.S. Provisional Application 63/164,503, filed on Mar. 22, 2021. The disclosures of these prior applications are considered part of the disclosure of this application and are hereby incorporated by reference in their entireties.

TECHNICAL FIELD

This disclosure relates to unsupervised parallel tacotron non-autoregressive and controllable text-to-speech.

BACKGROUND

Text-to-speech (TTS) systems read aloud digital text to a user and are becoming increasingly popular on mobile devices. Certain TTS models aim to synthesize various aspects of speech, such as speaking styles, to produce human-like, natural sounding speech. Synthesis in TTS models is a one-to-many mapping problem, as there can be multiple possible speech outputs for the different prosodies of text inputs. Many TTS systems utilize an autoregressive model that predicts current values based on previous values. While autoregressive TTS models can synthesize text and generate highly natural speech outputs, the hundreds of calculations required reduce efficiency during inference.

SUMMARY

One aspect of the disclosure provides a computer-implemented method that when executed on data processing hardware causes the data processing hardware to perform operations for training a non-autoregressive text-to-speech (TTS) model. The operations include obtaining a sequence representation of an encoded text sequence concatenated with a variational embedding. Using a duration model network, the operations also include predicting, based on the sequence representation, a phoneme duration for each phoneme represented by the encoded text sequence. Based on the predicted phoneme durations, the operations include learning, using a first function conditioned on the sequence representation, an interval representation and learning, using a second function conditioned on the sequence representation, an auxiliary attention context representation. The operations also include upsampling, using the interval representation matrix and the auxiliary attention context representation, the sequence representation into an upsampled output specifying a number of frames. The operations also include generating, as output from a spectrogram decoder that includes a stack of one or more self-attention blocks and based on the upsampled output, one or more predicted mel-frequency spectrogram sequences for the encoded text sequence. The operations also include determining a final spectrogram loss based on the one or more predicted mel-frequency spectrogram sequences and a reference mel-frequency spectrogram sequence and training the TTS model based on the final spectrogram loss.

Implementations of the disclosure may include one or more of the following optional features. In some implementations, the first function and the second function each include a respective multi-layer perception-based learnable function. The operations may further include determining a global phoneme duration loss based on the predicted phoneme durations and an average phoneme duration. Here, training the TTS model is further based on the global phoneme duration loss. In some examples, training the TTS model based on the final spectrogram loss and the global phoneme duration loss includes training the duration model network to predict the phoneme duration for each phoneme without using supervised phoneme duration labels extracted from an external aligner.

In some implementations, the operations further include using the duration model network by generating, based on the predicted phoneme durations for each phoneme represented by the encoded text sequence, respective start and end boundaries and mapping, based on a number of phonemes represented by the encoded text sequence and a number of reference frames in the reference mel-frequency spectrogram sequence, the respective start and end boundaries generated for each phoneme into respective grid matrices. Here, learning the interval representation is based on the respective grid matrices mapped from the start and end boundaries and learning the auxiliary attention context is based on the respective grid matrices mapped from the start and end boundaries. Upsampling the sequence representation into the upsampled output may include determining a product of the interval representation matrix and the sequence representation, determining an Einstein summation (einsum) of the interval representation matrix and the auxiliary attention context representation, and summing the product of the interval representation matrix and the sequence representation and a projection of the einsum to generate the upsampled output.

In some implementations, the operations further include: receiving training data that includes a reference audio signal and a corresponding input text sequence, the reference audio signal includes a spoken utterance and the input text sequence corresponds to a transcript of the reference audio signal; encoding, using a residual encoder, the reference audio signal into a variational embedding, the variational embedding disentangling style/prosody information from the reference audio signal; and encoding, using a text encoder, the input text sequence into the encoded text sequence. In some examples the residual encoder includes a global variational autoencoder (VAE). In these examples, encoding the reference audio signal into the variational embedding includes sampling the reference mel-frequency spectrogram sequence from the reference audio signal and encoding, using the global VAE, the reference mel-frequency spectrogram sequence into the variational embedding. Optionally, the residual encoder may include a phoneme-level fine-grained variational autoencoder (VAE). Here, encoding the reference audio signal into the variational embedding includes: sampling the reference mel-frequency spectrogram sequence from the reference audio signal; aligning the reference mel-frequency spectrogram sequence with each phoneme in a sequence of phonemes extracted from the input text sequence; and encoding, using the phoneme-level fine-grained VAE and based on aligning the reference mel-frequency spectrogram sequence with each phoneme in the sequence of phonemes, a sequence of phoneme-level variational embeddings.

The residual encoder includes a stack of lightweight convolution (LConv) blocks, each LConv block in the stack of LConv blocks may include a gated linear unit (GLU) layer, a LConv layer configured to receive an output of the GLU layer, a residual connection configured to concatenate an output of the LConv layer with an input to the GLU layer, and a final feedforward layer configured to receive, as input, the residual connection concatenating the output of the LConv layer with the input to the GLU layer. In some implementations, the operations further include: concatenating the encoded text sequence, the variational embedding, and a reference speaker embedding that represents an identity of a reference speaker that uttered the reference audio signal; and generating the sequence representation based on the duration modeling network receiving, as input, the concatenation of the encoded text sequence, the variational embedding, and the reference speaker embedding. In some examples, the input text sequence includes a sequence of phonemes. In these examples, encoding the input text sequence into the encoded text sequence includes: receiving, from a phoneme look-up table, a respective embedding of each phoneme in the sequence of phonemes; for each phoneme in the sequence of phonemes, processing, using an encoder pre-net neural network of the text encoder, the respective embedding to generate a respective transformed embedding of the phoneme; processing, using a bank of convolutional blocks, the respective transformed embeddings to generate convolution outputs; and processing, using a stack of self-attention blocks, the convolution outputs to generate the encoded text sequence. Optionally, each self-attention block in the stack of self-attention blocks includes an identical lightweight convolution (LConv) block. Each self-attention block in the stack of self-attention blocks includes an identical transformer block.

Another aspect of the disclosure provides a system for training a non-autoregressive text-to-speech (TTS) model that includes data processing hardware and memory hardware storing instructions that when executed on the data processing hardware cause the data processing hardware to perform operations. The operations include obtaining a sequence representation of an encoded text sequence concatenated with a variational embedding. Using a duration model network, the operations also include predicting, based on the sequence representation, a phoneme duration for each phoneme represented by the encoded text sequence. Based on the predicted phoneme durations, the operations include learning, using a first function conditioned on the sequence representation, an interval representation and learning, using a second function conditioned on the sequence representation, an auxiliary attention context representation. The operations also include upsampling, using the interval representation matrix and the auxiliary attention context representation, the sequence representation into an upsampled output specifying a number of frames. The operations also include generating, as output from a spectrogram decoder that includes a stack of one or more self-attention blocks and based on the upsampled output, one or more predicted mel-frequency spectrogram sequences for the encoded text sequence. The operations also include determining a final spectrogram loss based on the one or more predicted mel-frequency spectrogram sequences and a reference mel-frequency spectrogram sequence and training the TTS model based on the final spectrogram loss.

Implementations of the disclosure may include one or more of the following optional features. In some implementations, the first function and the second function each include a respective multi-layer perception-based learnable function. The operations may further include determining a global phoneme duration loss based on the predicted phoneme durations and an average phoneme duration. Here, training the TTS model is further based on the global phoneme duration loss. In some examples, training the TTS model based on the final spectrogram loss and the global phoneme duration loss includes training the duration model network to predict the phoneme duration for each phoneme without using supervised phoneme duration labels extracted from an external aligner.

In some implementations, the operations further include using the duration model network by generating, based on the predicted phoneme durations for each phoneme represented by the encoded text sequence, respective start and end boundaries and mapping, based on a number of phonemes represented by the encoded text sequence and a number of reference frames in the reference mel-frequency spectrogram sequence, the respective start and end boundaries generated for each phoneme into respective grid matrices. Here, learning the interval representation is based on the respective grid matrices mapped from the start and end boundaries and learning the auxiliary attention context is based on the respective grid matrices mapped from the start and end boundaries. Upsampling the sequence representation into the upsampled output may include determining a product of the interval representation matrix and the sequence representation, determining an Einstein summation (einsum) of the interval representation matrix and the auxiliary attention context representation, and summing the product of the interval representation matrix and the sequence representation and a projection of the einsum to generate the upsampled output.

In some implementations, the operations further include: receiving training data that includes a reference audio signal and a corresponding input text sequence, the reference audio signal includes a spoken utterance and the input text sequence corresponds to a transcript of the reference audio signal; encoding, using a residual encoder, the reference audio signal into a variational embedding, the variational embedding disentangling style/prosody information from the reference audio signal; and encoding, using a text encoder, the input text sequence into the encoded text sequence. In some examples the residual encoder includes a global variational autoencoder (VAE). In these examples, encoding the reference audio signal into the variational embedding includes sampling the reference mel-frequency spectrogram sequence from the reference audio signal and encoding, using the global VAE, the reference mel-frequency spectrogram sequence into the variational embedding. Optionally, the residual encoder may include a phoneme-level fine-grained variational autoencoder (VAE). Here, encoding the reference audio signal into the variational embedding includes: sampling the reference mel-frequency spectrogram sequence from the reference audio signal; aligning the reference mel-frequency spectrogram sequence with each phoneme in a sequence of phonemes extracted from the input text sequence; and encoding, using the phoneme-level fine-grained VAE and based on aligning the reference mel-frequency spectrogram sequence with each phoneme in the sequence of phonemes, a sequence of phoneme-level variational embeddings.

The residual encoder includes a stack of lightweight convolution (LConv) blocks, each LConv block in the stack of LConv blocks may include a gated linear unit (GLU) layer, a LConv layer configured to receive an output of the GLU layer, a residual connection configured to concatenate an output of the LConv layer with an input to the GLU layer, and a final feedforward layer configured to receive, as input, the residual connection concatenating the output of the LConv layer with the input to the GLU layer. In some implementations, the operations further include: concatenating the encoded text sequence, the variational embedding, and a reference speaker embedding that represents an identity of a reference speaker that uttered the reference audio signal; and generating the sequence representation based on the duration modeling network receiving, as input, the concatenation of the encoded text sequence, the variational embedding, and the reference speaker embedding. In some examples, the input text sequence includes a sequence of phonemes. In these examples, encoding the input text sequence into the encoded text sequence includes: receiving, from a phoneme look-up table, a respective embedding of each phoneme in the sequence of phonemes; for each phoneme in the sequence of phonemes, processing, using an encoder pre-net neural network of the text encoder, the respective embedding to generate a respective transformed embedding of the phoneme; processing, using a bank of convolutional blocks, the respective transformed embeddings to generate convolution outputs; and processing, using a stack of self-attention blocks, the convolution outputs to generate the encoded text sequence. Optionally, each self-attention block in the stack of self-attention blocks includes an identical lightweight convolution (LConv) block. Each self-attention block in the stack of self-attention blocks includes an identical transformer block.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
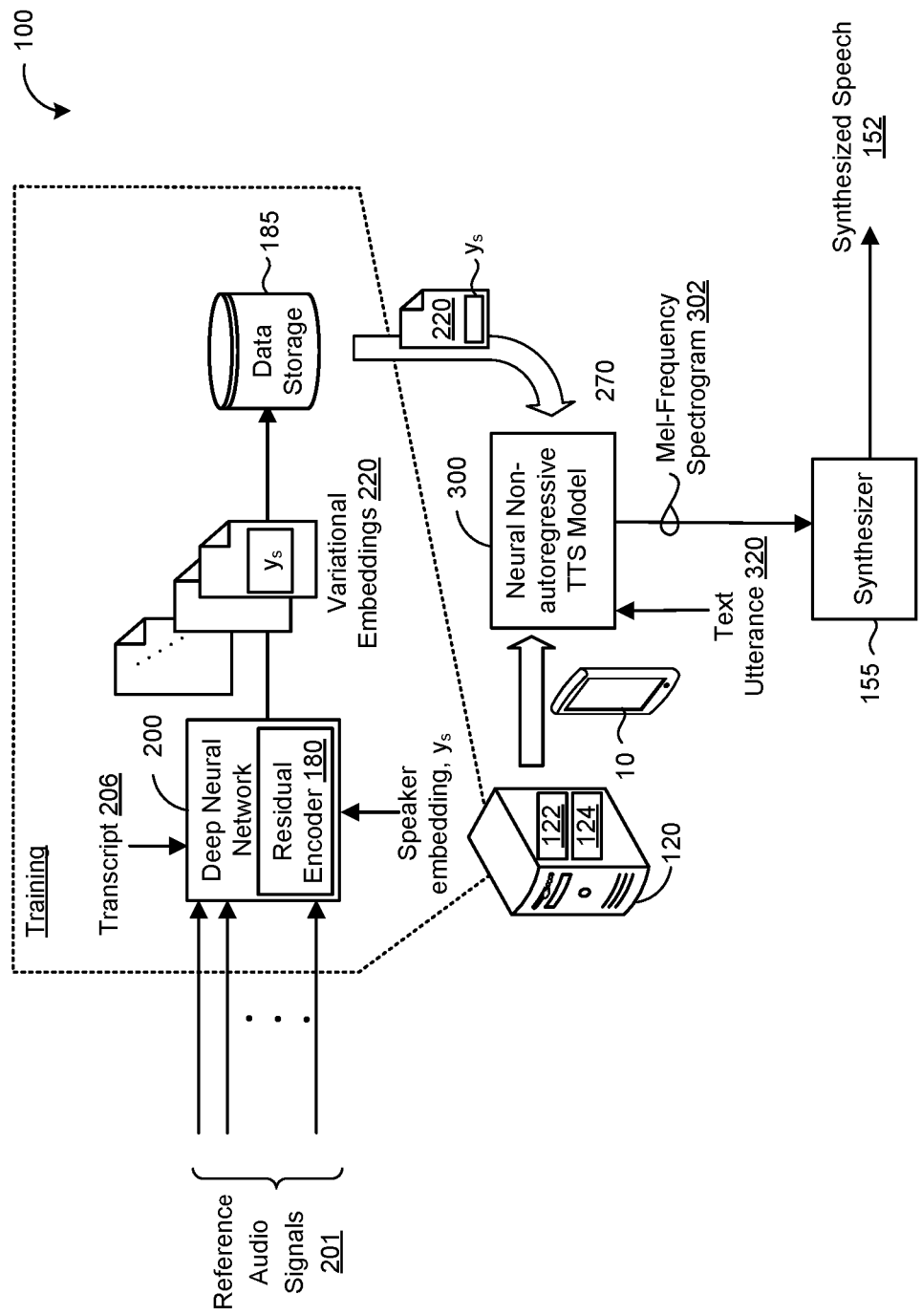
FIG. 1 is an example system for training a deep neural network to provide a non-autoregressive TTS model that predicts a spectrogram for a text utterance.

The synthesis of realistic human speech is an underdetermined problem in that a same text input has an infinite number of reasonable spoken realizations. While end-to-end neural network-based approaches are advancing to match human performance for short assistant-like utterances, neural network models are sometimes viewed as less interpretable or controllable than more conventional models that include multiple processing steps each operating on refined linguistic or phonetic representations. Sources of variability in speech include prosodic characteristics of intonation, stress, rhythm, and style, as well as speaker and channel characteristics. The prosodic characteristics of a spoken utterance convey linguistic, semantic, and emotional meaning beyond what is present in a lexical representation (e.g., a transcript of the spoken utterance).

Neural networks are machine learning models that employ one or more layers of nonlinear units to predict an output for a received input. For instance, neural network-based end-to-end text-to-speech (TTS) models may convert input text to output speech. Neural network TTS models provide potential for robustly synthesizing speech by predicting linguistic factors corresponding to prosody that are not provided by text inputs. As a result, a number of applications, such as audiobook narration, news readers, voice design software, and conversational assistants can produce realistically sounding synthesized speech that is not monotonous-sounding.

Many neural end-to-end TTS models utilize an autoregressive model that predicts current values based on previous values. For instance, many autoregressive models are based on recurrent neural networks that use some or all of an internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allows the cell to store previous states for the cell, e.g., for use in generating a current activation or to be provided to other components of the LSTM neural network.

While autoregressive TTS models can synthesize text and generate highly natural speech outputs, their architecture through a series of uni-directional LSTM-based decoder blocks with soft attention inherently makes both training and inference less efficient when implemented on modern parallel hardware compared to fully-feedforward architectures. Moreover, as autoregressive models train via teacher forcing by applying ground truth labels for each time step, autoregressive models are additionally prone to producing discrepancies between training and when the trained model is applied during inference. Together with the soft attention mechanism, these discrepancies can lead to synthesized speech output with reduced quality, such as the synthesized speech exhibiting robustness errors such as babbling, early cut-off, word repetition, and word skipping. The reduction in quality of synthesized speech in autoregressive TTS models may be further exacerbated as a size of the synthesized text increases.

To alleviate the aforementioned drawbacks of autoregressive-based TTS models, implementations herein are directed toward a non-autoregressive neural TTS model augmented with a variational autoencoder (VAE)-based residual encoder. As will become apparent, the VAE-based residual encoder may disentangle latent representations/states from reference audio signals that convey residual information, such as style/prosody information, which cannot be represented by the input text (e.g., phoneme sequence) to be synthesized or speaker identifiers (IDs) for the speakers that spoke the reference audio signals. That is to say, a latent representation enables the output synthesized speech produced by the TTS model to sound like the reference audio signal that was input to the residual encoder.

The non-autoregressive neural TTS model augmented with the VAE-based residual encoder provides a controllable model for predicting mel spectral information (e.g., a predicted mel-frequency spectrogram sequence) for an input text utterance, while at the same time effectively controlling the prosody/style represented in the mel spectral information. For instance, using a selected variational embedding learned by the VAE-based residual encoder to represent an intended prosody/style for synthesizing a text utterance into expressive speech, a spectrogram decoder of the TTS model may predict a mel-frequency spectrogram for the text utterance and provide the mel-frequency spectrogram as input to a synthesizer (e.g., a waveform synthesizer or a vocoder network) for conversion into a time-domain audio waveform indicative of synthesized speech having the intended prosody/style. As will become apparent, the non-autoregressive TTS model is trained on sample input text sequences and corresponding reference mel-frequency spectrogram sequences of human speech alone so that the trained TTS model can convert an input text utterance to a mel-frequency spectrogram sequence having an intended prosody/style conveyed by a learned prior variational embedding.

FIG. 1 shows an example system 100 for training a deep neural network 200 that is augmented with a VAE-based residual encoder 180 to provide a non-autoregressive neural TTS model (or simply 'TTS model') 300, and for predicting a spectrogram (i.e., mel-frequency spectrogram sequence) 302 for a text utterance 320 using the TTS model 300. The system 100 includes a computing system 120 having data processing hardware 122 and memory hardware 124 in communication with the data processing hardware 122 and storing instructions that cause the data processing hardware 122 to perform operations. In some implementations, the computing system 120 (e.g., the data processing hardware 122) or a user computing device 10 executing the trained TTS model 300 provides the predicted mel-frequency spectrogram 302 predicted by the TTS model 300 from the input text utterance 320 to a synthesizer 155 for conversion into a time-domain audio waveform indicative of synthesized speech 152 that may be audibly output as a spoken representation of the input text utterance 320. A time-domain audio waveform includes an audio waveform that defines an amplitude of an audio signal over time. The synthesizer 155 may be separately trained and conditioned on mel-frequency spectrograms for conversion into time-domain audio waveforms.

A mel-frequency spectrogram includes a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. The synthesizer 155 may include a vocoder neural network that may include any network that is configured to receive mel-frequency spectrograms and generate audio output samples (e.g., time-domain audio waveforms) based on the mel-frequency spectrograms. For example, the vocoder network 155 can be based on the parallel feed-forward neural network described in van den Oord, Parallel WaveNet: Fast High-Fidelity Speech Synthesis, available at https://arxiv.org/pdf/1711.10433.pdf, and incorporated herein by reference. Alternatively, the vocoder network 155 can be an autoregressive neural network. The synthesizer 155 may include a waveform synthesizer such as a Griffin-Lim synthesizer or a trainable spectrogram to waveform inverter. The choice of the synthesizer 155 has no impact on resulting prosody/style of the synthesized speech 152, and in practice, only impacts audio fidelity of the synthesized speech 152

Since the input text utterance 320 has no way of conveying context, semantics, and pragmatics to guide a desired prosody/style of the synthesized speech 152, the TTS model 300 may apply a variational embedding 220 as a latent variable specifying an intended prosody/style in order to predict a mel-frequency spectrogram 302 for the text utterance 320 that conveys the intended prosody/style specified by the variational embedding 220. In some examples, the computing system 120 implements the TTS model 300. Here, a user may access the TTS model 300 through a user computing device 10 and provide the input text utterance 320 for the TTS model 300 to synthesize into expressive speech 152 having an intended prosody/style specified by a variational embedding 220. The variational embedding 220 may be selected by the user and correspond to a prior variational embedding 220 sampled from the residual encoder 180. The variational embedding 220 may be a per-speaker variational embedding 220 that the user may select by providing a speaker identifier (ID) (i.e., through an interface executing on the user computing device 10) that identifies a speaker who speaks with the intended prosody/style. Here, each speaker ID may map to a respective per-speaker variational embedding 220 previously learned by the residual encoder 180. Additionally or alternatively, the user could provide an input specifying a particular vertical associated with a respective prosody/style. Here, different verticals (e.g., newscasters, sportscasters, etc.) may each map to a respective variational embedding 220 previously learned by the residual encoder 180 that conveys the respective prosody/style associated with the vertical. In these examples, the synthesizer 155 may reside on the computing system 120 or the user computing device 10. When the synthesizer 155 resides on the computing system 120, the computing system 120 may transmit a time-domain audio waveform representing the synthesized speech 152 to the user computing device 10 for audible playback. In other examples, the user computing device 10 implements the TTS model 300. The computing system may include a distributed system (e.g., cloud computing environment).

In some implementations, the deep neural network 200 is trained on a large set of reference audio signals 201. Each reference audio signal 201 may include a spoken utterance of human speech recorded by a microphone and having a prosodic/style representation. During training, the deep neural network 200 may receive multiple reference audio signals 201 for a same spoken utterance, but with varying prosodies/styles (i.e., the same utterance can be spoken in multiple different ways). Here, the reference audio signals 201 are of variable-length such that the duration of the spoken utterances varies even though the content is the same. The deep neural network 200 may also receive multiple sets of reference audio signals 201 where each set includes reference audio signals 201 for utterances having similar prosodies/styles spoken by a same respective speaker, but conveying different linguistic content. The deep neural network 200 augmented with the VAE-based residual encoder 180 is configured to encode/compress the prosodic/style representation associated with each reference audio signal 201 into a corresponding variational embedding 220. The variational embedding 220 may include a fixed-length variational embedding 220. The deep neural network 200 may store each variational embedding 220 in storage 185 (e.g., on the memory hardware 124 of the computing system 120) along with a corresponding speaker embedding, $y_s$, representing a speaker identity 205 (FIG. 2) of a reference speaker that uttered the reference audio signal 201 associated the variational embedding 220. The variational embedding 220 may be a per-speaker variational embedding that includes an aggregation (e.g., mean) of multiple variational embeddings 220 encoded by the residual encoder 180 from reference audio signals 201 spoken by a same speaker.

During inference, the computing system 120 or the user computing device 10 may use the trained TTS model 300 to predict a mel-frequency spectrogram sequence 302 for a text utterance 320. The TTS model 300 may select a variational embedding 220 from the storage 185 that represents an intended prosody/style for the text utterance 320. Here, the variational embedding 220 may correspond to a prior variational embedding 220 sampled from the VAE-based residual encoder 180. The TTS model 300 may predict the mel-frequency spectrogram sequence 302 for the text utterance 320 using the selected variational embedding 220. In the example shown, the synthesizer 155 uses the predicted mel-frequency spectrogram sequence 302 to produce synthesized speech 152 having the intended prosody/style specified by the variational embedding 220.

In a non-limiting example, an individual could train the deep neural network 200 to learn a per-speaker variational embedding that conveys a prosodic/style representation associated with a particular speaker. For instance, the host of the Techmeme Ride Home podcast, Brian McCullough, could train the deep neural network 200 on reference audio signals 201 that include previous episodes of the podcast along with input text sequences 206 corresponding to transcripts of the reference audio signals 201. During training, the VAE-based residual encoder 180 may learn a per-speaker variational embedding 220 that represents the prosodic/style of Brian narrating the Ride Home podcast. Brian could then apply this per-speaker variational embedding 220 for use by the trained TTS model 300 (executing on the computing system 120 or the user computing device 10) to predict mel-frequency spectrogram sequences 302 for text utterances 320 corresponding to a transcript for a new episode of the Ride Home podcast. The predicted mel-frequency spectrogram sequences 302 may be provided as input to the synthesizer 155 for producing synthesized speech 152 having Brian's unique prosody/style as specified by his per-speaker variational embedding 220. That is, the resulting synthesized speech 152 may sound exactly like Brian's voice and possess Brian's prosody/style for narrating the episode of the Ride Home podcast. Accordingly, to air the new episode, Brian only has to provide a transcript for the episode and use the trained TTS model 300 to produce synthesized speech 152 that may be streamed to the loyal listeners (also referred to as Mutant Podcast Army) of the Ride Home podcast.

Figure 2:
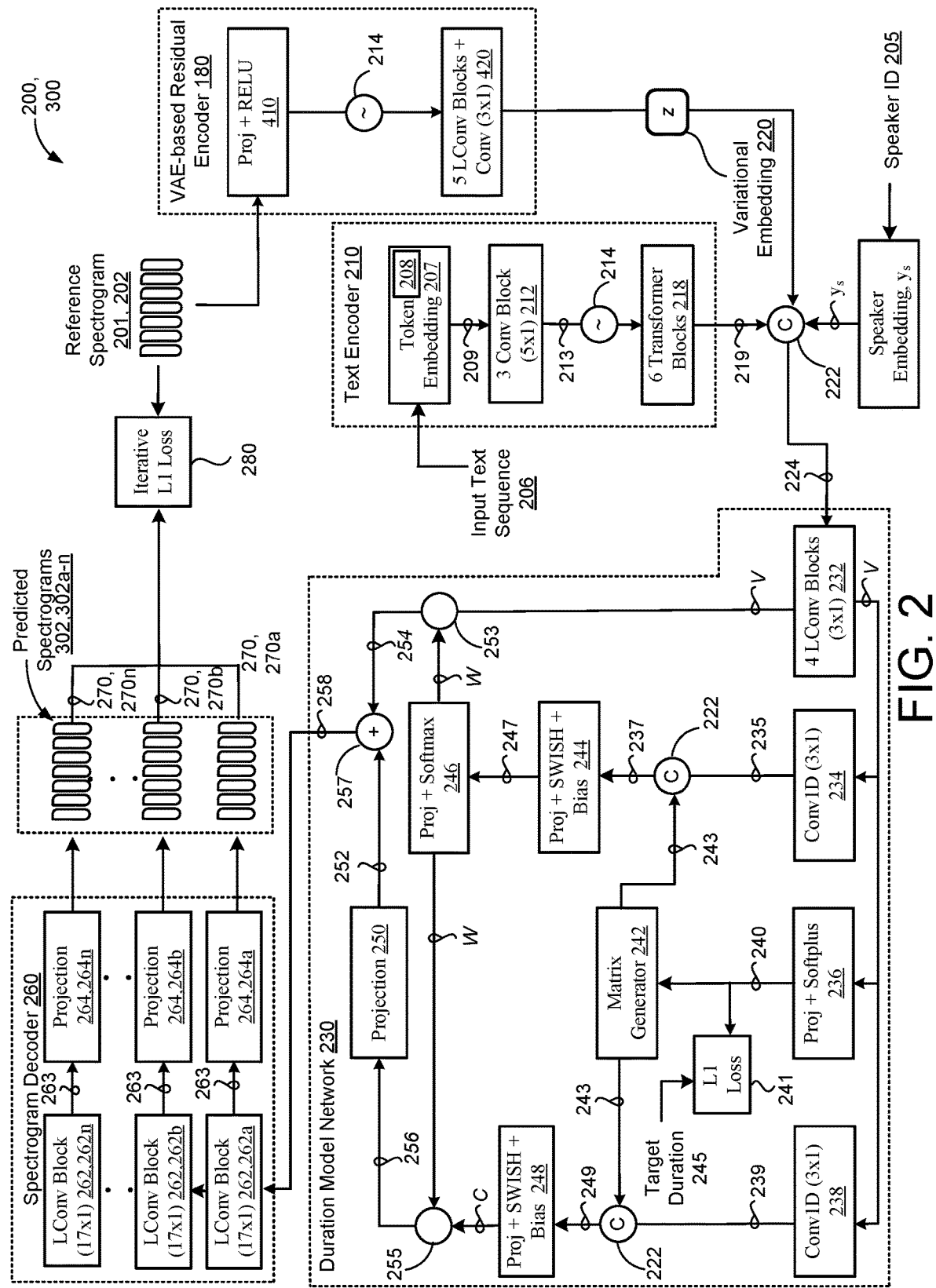
FIG. 2 is a schematic view of a non-autoregressive neural network training a non-autoregressive TTS model.

FIG. 2 shows a non-autoregressive neural network (e.g., the deep neural network of FIG. 1) 200 for training the non-autoregressive TTS model 300. The deep neural network 200 includes the VAE-based residual encoder 180, a text encoder 210, a duration model network 230, and a spectrogram decoder 260. The deep neural network 200 may be trained on training data that includes multiple reference audio signals 201 and corresponding input text sequences 206. Each reference audio signal 201 includes a spoken utterance of human speech and the corresponding input text sequence 206 corresponds to a transcript of the reference audio signal 201. In the example shown, the VAE-based residual encoder 180 is configured to encode the reference audio signal 201 into a variational embedding (z) 220. Specifically, the residual encoder 180 receives a reference mel-frequency spectrogram sequence 202 sampled from the reference audio signal 201 and encodes the reference mel-frequency spectrogram sequence 202 into the variational embedding 220, whereby the variational embedding 220 disentangles style/prosody information from the reference audio signal 201 corresponding to the spoken utterance of human speech. As such, the variational embedding 220 corresponds to a latent state of a reference speaker, such as affect and intent, which contributes to the prosody, emotion, and/or speaking style of the reference speaker. As used herein, the variational embedding 220 includes both style information and prosody information. In some examples, the variational embedding 220 includes a vector of numbers having a capacity represented by a number of bits in the variational embedding 220. The reference mel-frequency spectrogram sequence 202 sampled from the reference audio signal 201 may have a length LR and a dimension DR. As used herein, the reference mel-frequency spectrogram sequence 202 includes a plurality of fixed-length reference mel-frequency spectrogram frames sampled/extracted from the reference audio signal 201. Each reference mel-frequency spectrogram frame may include a duration of five milliseconds.

The VAE-based residual encoder 180 corresponds to a posterior network that enables unsupervised learning of latent representations (i.e. variational embeddings (z)) of speaking styles. Learning variational embeddings through the use of VAE networks provides favorable properties of disentangling, scaling, and combination for simplifying style control compared to heuristic-based systems. Here, the residual encoder 180 includes a phoneme-level fine-grained VAE network that includes a projection layer with a rectified linear unit (ReLU) 410 and a stack of lightweight convolution (LConv) blocks 420 having multi-headed attention. The phoneme-level fine-grained VAE network 180 is configured to encode spectrogram frames from the reference mel-frequency spectrogram sequence 202 associated with each phoneme in the input text sequence 206 into a respective phoneme-level variational embedding 220. More specifically, the phoneme-level fine-grained VAE network may align the reference mel-frequency spectrogram sequence 202 with each phoneme in a sequence of phonemes extracted from the input text sequence 206 and encode a sequence of phoneme-level variational embeddings 220. Accordingly, each phoneme-level variational embedding 220 in the sequence of phoneme-level variational embeddings 220 encoded by the phoneme-level fine-grained VAE network 180 encodes a respective subset of one or more spectrogram frames from the reference mel-frequency spectrogram sequence 202 that includes a respective phoneme in the sequence of phonemes extracted from the input text sequence 206. The phoneme-level fine-grained VAE network 180 may initially concatenate the reference mel-frequency spectrogram sequence 202 with a speaker embedding $y_s$, representing a speaker that spoke the utterance associated with the reference mel-frequency spectrogram sequence 202, and sinusoidal positional embeddings 214 indicating phoneme position information for each phoneme in the sequence of phonemes extracted from the input text sequence 206. In some examples, the residual encoder 180 includes positional embeddings (not shown) in place of sinusoidal positional embeddings 214. Each sinusoidal positional embedding 214 may include a fixed-length vector that contains information about a specific position of a respective phoneme in the sequence of phonemes extracted from the input text sequence 206. Subsequently, the concatenation is applied to a stack of five (5) 8-headed 17×1 LConv blocks 420 to compute attention with a layer normalized encoded text sequence 219 output from the text encoder 210.

Figure 5:
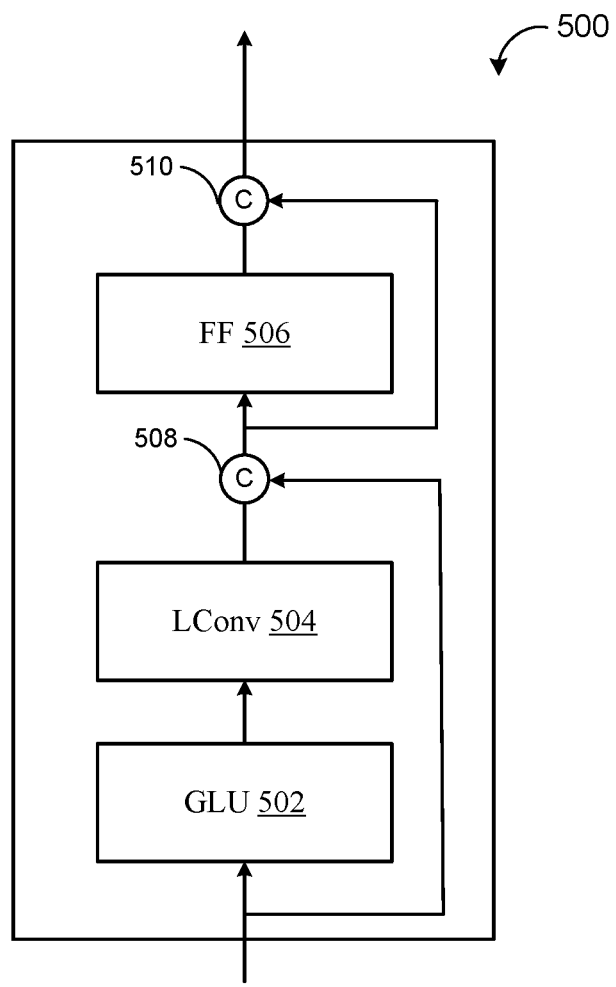
FIG. 5 is a schematic view of an example lightweight convolution block.

FIG. 5 shows a schematic view 500 of an example LConv block (e.g., stack of LConv blocks 420) having a gated linear unit (GLU) layer 502, a LConv layer 504 configured to receive an output of the GLU layer 502, and a feedforward (FF) layer 506. The example LConv block 500 also includes a first residual connection 508 (e.g., first concatenator 508) configured to concatenate an output of the LConv layer 504 with an input to the GLU layer 502. The FF layer 506 is configured to receive, as input, the first residual connection 508 that concatenates the output of the LConv layer 504 with the input to the GLU layer 502. The example LConv block 500 also includes a second residual connection 510 (e.g., second concatenator 510) configured to concatenate the output of the FF layer 506 with the first residual connection 508. The example LConv block 500 may perform FF mixing in the FF layer 506 using a structure ReLU($W_1 X + b_1$)$W_2 + b_2$ where $W_1$ increases the dimension by a factor of 4.

In other implementations, the VAE-based residual encoder 180 includes a global VAE network that the non-autoregressive deep neural network 200 may employ in lieu of the phoneme-level fine-grained VAE network depicted in FIG. 2. The global VAE network encodes the reference mel-frequency spectrogram sequence 202 into a global variational embedding 220 at the utterance level. Here, the global VAE network includes two stacks of lightweight convolution (LConv) blocks each having multi-headed attention. Each LConv block in the first and second stacks of the global VAE network 180 may include eight (8) heads. In some examples, the first stack of LConv blocks includes three (3) 17×1 LConv blocks and the second stack of LConv blocks following the first stack includes five 17×1 LConv blocks interleaved with 3×1 convolutions. This configuration of two stacks of LConv blocks permits the global VAE network 180 to successively down sample latent representations before applying global average pooling to obtain the final global variational embedding 220. A projection layer may project a dimension of the global variational embedding 220 output from the second stack of LConv blocks. For instance, the global variational embedding 220 output from the second stack of LConv blocks may have a dimension of eight (8) and the projection layer may project the dimension to thirty-two (32).

Figure 4:
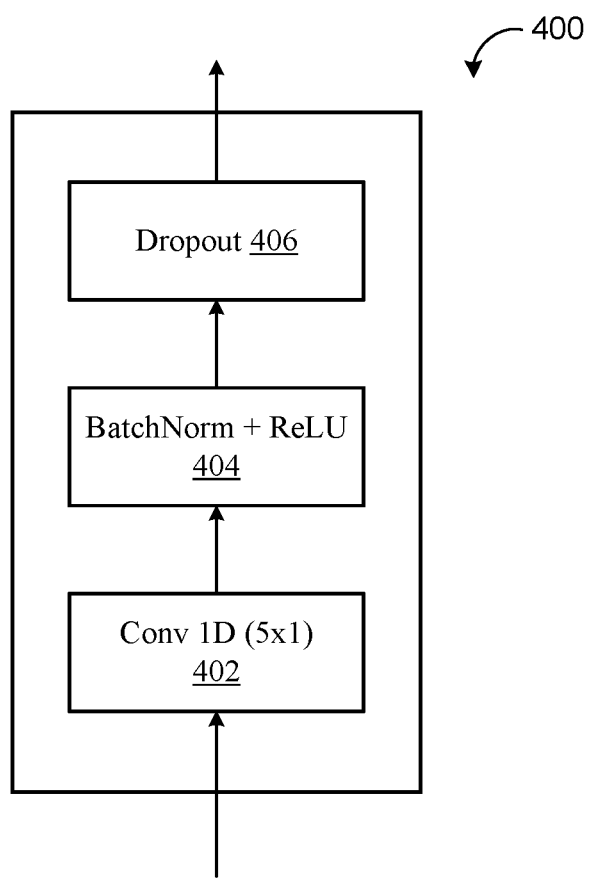
FIG. 4 is a schematic view of an example convolutional block.

With continued reference to FIG. 2, the text encoder 210 encodes the input text sequence 206 into a text encoding sequence 219. The text encoding sequence 219 includes an encoded representation of a sequence of speech units (e.g., phonemes) extracted from the input text sequence 206. The input text sequence 206 may include words each having one or more phonemes, silences at all word boundaries, and punctuation marks. Thus, the input text sequence 206 includes a sequence of phonemes and the text encoder 210 may receive, from a token embedding look-up table 207, a respective token embedding for each phoneme in the sequence of phonemes. Here, the respective token embedding includes a phoneme embedding. However, in other examples, the token embedding look-up table 207 may obtain token embeddings for other types of speech inputs associated with the input text sequence 206 instead of phonemes, such as, without limitation, sub-phonemes (e.g., senomes), graphemes, word pieces, or words in the utterance. After receiving the respective token embedding of each phoneme in the sequence of phonemes, the text encoder 210 uses an encoder pre-net neural network 208 to process each respective token embedding to generate a respective transformed embedding 209 of each phoneme. Thereafter, a bank of convolutional (Conv) blocks 212 may process the respective transformed embeddings 209 to generate convolution outputs 213. In some examples, the bank of Conv blocks 212 includes three (3) identical 5×1 Conv blocks. FIG. 4 shows a schematic view 400 an example Conv block having a Conv layer 402, a batch normalization layer 404, and a dropout layer 406. During training, the batch normalization layer 404 may apply batch normalization to reduce internal covariate shift. The dropout layer 406 may reduce overfitting. Finally, a stack of self-attention blocks 218 process the convolution outputs 213 to generate the encoded text sequence 219. In the example shown, the stack of self-attention blocks 218 includes six (6) transformer blocks. In other examples, the self-attention blocks 218 may include LConv blocks in lieu of transformer blocks.

Notably, since each convolution output 213 flows through the stack of self-attention blocks 218 simultaneously, the stack of self-attention blocks 218 have no knowledge of position/order of each phoneme in the input text utterance 206. Thus, in some examples, sinusoidal positional embeddings 214 are combined with the convolution output 213 to inject necessary position information indicating the order of each phoneme in the input text sequence 206. In other examples, encoded positional embeddings are used in place of the sinusoidal positional embeddings 214. By contrast, autoregressive encoders that incorporate recurrent neural networks (RNNs) inherently take the order of each phoneme into account since each phoneme is parsed from the input text sequence in a sequential matter. However, the text encoder 210 integrating the stack of self-attention blocks 218 that employ multi-head self-attention avoids the recurrence of auto-regressive encoders to result in drastically reduced training time, and theoretically, capture longer dependences in the input text sequence 206.

With continued reference to FIG. 2, a concatenator 222 concatenates the variational embedding 220 from the residual encoder 180, the encoded text sequence 219 output from the text encoder 210, and a reference speaker embedding ys representing a speaker identity 205 of a reference speaker that uttered the reference audio signal into a concatenation 224. The duration model network 230 receives the concatenation 224 and is configured to generate an upsampled output 258 that specifies a number of frames for the encoded text sequence 219 from the concatenation 224. In some implementations, the duration model network 230 includes a stack of self-attention blocks 232 followed by two independent small convolution blocks 234, 238 and a projection with a softplus activation 236. In the example shown, the stack of self-attention blocks includes four (4) 3×1 LConv blocks 232. As described above with reference to FIG. 5, each LConv block in the stack of self-attention blocks 232 may include a GLU unit 502, a LConv layer 504, and a FF layer 506 with residual connections. The stack of self-attention blocks 232 generates a sequence representation V based on the concatenation 224 of the encoded text sequence 219, variational embedding 220, and reference speaker embedding ys. Here, the sequence representation V represents a sequence of M×1 column vectors (e.g., $V = \{v_1, \ldots, v_k\}$).

In some implementations, the first convolution block 234 generates an output 235 and the second convolution block 238 generates an output 239 from the sequence representation V The convolution blocks 234, 238 may each include a 3×1 Conv block that has a kernel-width of 3 and output dimension of 3. The projection with the softplus activation 236 may predict a phoneme duration 240 (e.g., $\{d_1, \ldots, d_K\}$) for each phoneme represented by the encoded text sequence 219. Here, the softplus activation 236 receives, as input, the sequence representation V to predict the phoneme durations 240. The duration model network 230 computes a global phoneme duration loss 241 (e.g., L1 loss term 241) between the predicted phoneme durations 240 and a target average duration 245 represented by:

$$\mathcal{L}_{dur} = \frac{1}{k}\left\|T - \sum_{k=1}^{K} d_k\right\|_1 \quad (1)$$

where $\mathcal{L}_{dur}$ represents the global phoneme duration loss 241 (e.g., L1 loss term 241), K represents the total number of phonemes (e.g., tokens) of the input text sequence 206, $d_k$ represents a phoneme duration 240 for a particular phoneme k from the total number of phonemes K, and T represents the total target frame duration from the reference mel-frequency spectrogram sequence 202.

Figure 3:
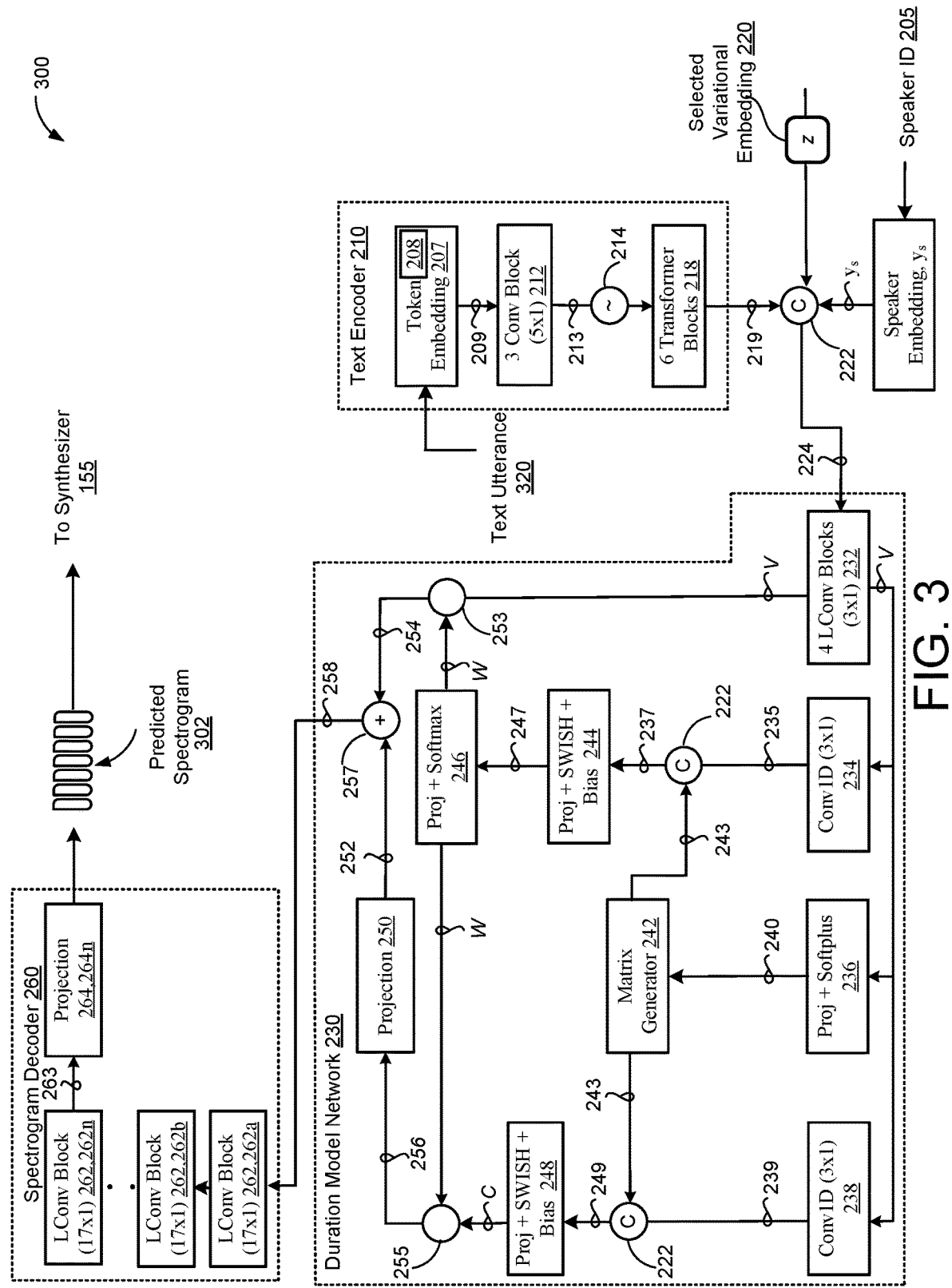
FIG. 3 is a schematic view of executing a trained non-autoregressive TTS model trained by the non-autoregressive deep neural network of FIG. 2.

In some examples, training the TTS model 300 is based on the global phoneme duration loss 241 from Equation 1. The individual target duration for each phoneme is unknown, thus, the duration model network 230 determines the target average duration 245 based on a proportion of the T total frame duration from the entire reference mel-frequency spectrogram sequence 202 and K total number of phonemes (e.g., tokens) in the input text sequence 206. That is, the target average duration 245 is the average duration for all phonemes using the reference mel-frequency spectrogram sequence 202 and input text sequence 206. The L1 loss term 241 is then determined between the predicted phoneme durations 240 and the target average duration 245 determined using the reference mel-frequency spectrogram sequence 202 and input text sequence 206. As such, the duration model network 230 learns to predict phoneme durations 240 in an unsupervised manner without the use of supervised phoneme duration labels provided from an external aligner. While external aligners are capable of providing reasonable alignments between phonemes and mel-spectral frames, phoneme duration rounding is required by a length regulator to upsample phonemes in the input text sequence 206 according to their duration which leads to rounding errors that may persist. In some instances, using supervised duration labels from the external aligner during training and using predicted durations during inference creates phoneme duration discrepancies between training the TTS model 300 (FIG. 2) and inference of the TTS model 300 (FIG. 3). Moreover, such rounding operations are not differentiable, and thus, an error gradient is unable to propagate through the duration model network 230.

The duration model network 230 includes a matrix generator 242 to define token boundaries $[S_k, e_k]k_{k=1}^K$ from the predicted phoneme durations 240. The matrix generator 242 determines the token boundaries (e.g., phoneme boundaries) from the predicted phoneme durations 240 as follows:

$$s_k = \sum_{i=1}^{k-1} d_i \quad (2)$$

$$e_k = s_k + d_k \quad (3)$$

In Equation 2, $s_k$ represents the start of a token boundary (also referred to herein as start boundary $s_k$) for a particular phoneme k. In Equation 3, $e_k$ represents the end of a token boundary (also referred to herein as end boundary $e_k$) for a particular phoneme k. The matrix generator 242, using the start and end boundaries $s_k$, $e_k$ from Equations 2 and 3, maps the token boundaries into two token boundary grid matrices S and E as follows.

$$S_{tk} = t - s_k \quad (4)$$

$$E_{tk} = e_k - t \quad (5)$$

Equation 4 maps each start boundary $s_k$ to the $S_{tk}$ grid matrix giving the distances to the start boundaries $s_k$ of token k at time t. Equation 5 maps each end boundary $e_k$ to the $E_{tk}$ grid matrix giving the distances to the end boundaries $e_k$ of token k at time t. The matrix generator 242 generates the start and end boundaries $s_k$, $e_k$ (also referred to collectively as token boundaries $s_k$, $e_k$) and maps the token boundaries $s_k$, $e_k$ to a start token boundary grid matrix S and an end token boundary grid matrix E (referred to collectively as grid matrices 243) respectively. Here, the grid matrices 243 are of size T×K where K represents the number of phonemes in the input text sequence 206 and T represents the number of frames in the reference mel-frequency spectrogram sequence 202 and the total frame duration. The matrix generator 242 may map, based on a number of phonemes represented by the encoded text sequence 219 and a number of reference frames in the reference mel-frequency spectrogram sequence 202, the respective start and end boundaries $s_k$, $e_k$ generated for each phoneme in the sequence of phonemes into respective grid matrices 243 (e.g., start token boundary grid matrix S and end token boundary grid matrix E).

The duration model network 230 includes a first function 244 to learn an interval representation matrix W In some implementations, the first function 244 includes two (2) projection layers with bias and Swish-activation. In the example shown, both projections of the first function 244 project and output with a dimension of 16 (i.e., P=16). The first function 244 receives a concatenation 237, as input, from a concatenator 222. The concatenator 222 concatenates the output 235 from the convolution block 234 and the grid matrices 243 to generate the concatenation 237. The first function 244 projects an output 247 using the concatenation 237. Subsequently, the first function 244 generates the interval representation matrix W (e.g., T×K attention matrix) from a projection with a softplus activation 246 of the output 247. The interval representation matrix W may be learned based on the respective grid matrices 243 mapped from the start and end boundaries $s_k$, $e_k$ as follows:

$$W = \text{Softmax}(\text{MLP}(S, E, \text{Conv1D}(V))) \quad (6)$$

Equation 6 computes the interval representation W (e.g., T×K attention matrix) using a Softmax function and multi-layer perceptron-based (MLP) learnable function of the grid matrices 243 (e.g., the start token boundary grid matrix S and the end token boundary grid matrix E) and the sequence representation V. The MLP learnable function includes a third projection layer with an output dimension of 1 which is fed to the Softmax activation function and the Conv1D(V) includes a kernel-width of 3, an output dimension of 8, batch normalization, and Swish-activation. Here, the (k, t)-th element of the grid matrices 243 gives an attention probability between the k-th token (e.g., phoneme) and the t-th frame and W( ) is a learnable function mapping the grid matrices 243 and the sequence representation V with a small 1D convolution layer.

The duration model network 230 may learn an auxiliary attention context tensor C (e.g., $C = [C_1, \ldots, C_P]$) using a second function 248 conditioned on the sequence representation V. Here, $C_p$ includes a T×K matrix from the auxiliary attention context tensor C. The auxiliary attention context tensor C may include auxiliary multi-headed attention-like information for the spectrogram decoder 260. A concatenator 222 concatenates the grid matrices 243 and the output 239 to generate a concatenation 249. The second function 248 may include two (2) projection layers with bias and Swish-activation. In the example shown, the projection of the second function 248 projects an output with a dimension of 2 (i.e., P=2). The second function 248 receives, as input, the concatenation 249 to generate the auxiliary attention context tensor C based on the respective grid matrices 243 mapped from the start and end boundaries $s_k$, $e_k$ and the sequence representation V as follows:

$$C = MLP(S, E, Conv1D(V)) \qquad (7)$$

Equation 7 computes the auxiliary attention context tensor C using a multi-layer perceptron-based (MLP) learnable function of the grid matrices 243 (e.g., the start token boundary grid matrix S and the end token boundary grid matrix E) and the sequence representation V. The auxiliary attention context tensor C may help smooth the optimization and converge the stochastic gradient descent (SGD). The duration model network 230 may upsample the sequence representation V into the upsampled output 258 (e.g., O {$o_1, \ldots, o_T$}) with a number of frames. Here, the number of frames of the upsampled output 258 corresponds to the predicted length of the predicted mel-frequency spectrogram 302 determined by the predicted phoneme duration 240 of the corresponding input text sequence 206. Upsampling the sequence representation V into the upsampled output 258 includes determining a product 254 of the interval representation matrix W and the sequence representation V using a multiplier 253.

The duration model network 230 determines an Einstein summation (einsum) 256 of the interval representation matrix W and the auxiliary attention context tensor C using an einsum operator 255. A projection 250 projects the einsum 256 into a projected output 252 that is added to the product 254 at an adder 257 to generate the upsampled output 258. Here, the upsampled output 258 may be represented as follows:

$$O = WV + [(W \odot C_1)1_k \ldots (W \odot C_P)1_k]A \qquad (8)$$

where O denotes the upsampled output 258, $\odot$ denotes element-wise multiplication, $1_k$ represents a K×1 column vector that includes elements all equal to 1, and A is a P×M projection matrix.

With continued reference to FIG. 2, the spectrogram decoder 260 is configured to receive, as input, the upsampled output 258 of the duration model network 230, and generate, as output, one or more predicted mel-frequency spectrogram sequences 302 for the input text sequence 206. The spectrogram decoder 260 may include a stack of multiple self-attention blocks 262, 262a-n with multi-headed attention. In some examples, the spectrogram decoder 260 includes six (6) eight-headed 17×1 LConv blocks with 0.1 dropout. The spectrogram decoder 260 may include more or less than six LConv blocks. As described above with reference to FIG. 5, each LConv block in the stack of self-attention blocks 232 may include a GLU unit 502, a LConv layer 504, and a FF layer 506 with residual connections. In other examples, each self-attention block 262 in the stack includes an identical transformer block.

In some implementations, the spectrogram decoder 260 generates a respective predicted mel-frequency spectrogram sequence 302, 302a-n as output from each self-attention block 262 in the stack of self-attention blocks 262, 262a-n. The network 200 may be trained so that a number of frames in each respective predicted mel-frequency spectrogram sequence 302 is equal to a number of frames in the reference mel-frequency spectrogram sequence 202 input to the residual encoder 180. In the example shown, each self-attention block 262a-n is paired with a corresponding projection layer 264a-n that projects an output 263 from the self-attention block 262 to generate the respective predicted mel-frequency spectrogram sequence 302a-n having a dimension that matches a dimension of the reference mel-frequency spectrogram sequence 202. In some examples, the projection layer 264 projects a 128-bin predicted mel-frequency spectrogram sequence 302. By predicting multiple mel-frequency spectrogram sequences 302a-n, the non-autoregressive neural network 200 may be trained using a soft dynamic time warping (soft-DTW) loss. That is, because the predicted mel-frequency spectrogram sequence 302 may be of a different length (e.g., number of frames) from the reference mel-frequency spectrogram sequence 202 the spectrogram decoder 260 cannot determine a regular Laplace loss. Rather, the spectrogram decoder 260 determines a soft-DTW loss between the reference mel-frequency spectrogram sequence 202 and the predicted mel-frequency spectrogram sequence 302 that may include different lengths. In particular, for each respective predicted mel-frequency spectrogram sequence 302a-n, the spectrogram decoder 260 determines a respective spectrogram loss 270, 270a-n based on the corresponding predicted mel-frequency spectrogram sequence 302 and the reference mel-frequency spectrogram sequence 202. The respective spectrogram loss 270 may include a soft-DTW loss term determined by the recursion as follows:

$$r_{i,j} = \min^\gamma \begin{cases} r_{i-1,j} + \|x_{i-1} - \bar{x}_j\|_1 + \text{warp} \\ r_{i,j-1} + \|x_i - \bar{x}_{j-1}\|_1 + \text{warp} \\ r_{i-1,j-1} + \|x_{i-1} - \bar{x}_{j-1}\|_1 \end{cases} \qquad (9)$$

In Equation 9, $r_{i,j}$ represents the distance between the reference mel-frequency spectrogram sequence frames from 1 to i and the predicted mel-frequency spectrogram sequence frames from 1 to j with the best alignment. Here, $\min^\gamma$ includes a generalized minimum operation with a smoothing parameter $\gamma$, warp includes a warp penalty, and $x_i$ and $\bar{x}_j$ are the reference mel-frequency spectrogram frames and the predicted mel-frequency spectrogram sequence frames in time i and j, respectively.

The soft-DTW loss term recursion is computationally intensive and may include a complexity of $O(T^2)$, a diagonal band width fixed at 60, a warp penalty of 128, and a smoothing parameter $\gamma$ of 0.05. For instance, a first spectrogram loss 270a may be determined based on a first predicted mel-frequency spectrogram sequence 302a and the reference mel-frequency spectrogram sequence 202. Here, the first predicted mel-frequency spectrogram sequence 302a and the reference mel-frequency spectrogram sequence 202 may be the same or different lengths. A second spectrogram loss 270b may be determined based on a first predicted mel-frequency spectrogram sequence 302a and the reference mel-frequency spectrogram sequence 202, and so on until all of the respective spectrogram losses 270a-n are iteratively determined the predicted mel-frequency spectrogram sequence 302a-n. The spectrogram losses 270, including the soft-DTW loss terms, may be aggregated to generate a final soft-DTW loss 280. The final soft-DTW loss 280 may correspond to an iterative soft-DTW loss term 280. The final soft-DTW loss 280 may be determined from any combination of predicted mel-frequency spectrogram sequences 302 and the reference mel-frequency spectrogram sequences 202 of the same and/or different lengths as follows:

$$\mathcal{L} = \frac{1}{LT}\sum_{l=1}^{L}\mathcal{L}_{spec}^{(l)} + \lambda_{dur}\mathcal{L}_{dur} + \beta D_{KL} \qquad (10)$$

In Equation 10, $\mathcal{L}$ includes the final soft-DTW loss 280, $\mathcal{L}_{spec}^{(l)}$ includes the soft-DTW L1 spectrogram reconstruction loss for the 1-th iteration in the spectrogram decoder, $\mathcal{L}_{dur}$ includes the average duration L1 loss, and $D_{KL}$ includes the KL divergence between prior and posterior from the residual encoder. Training the deep neural network 200 aims to minimize the final soft-DTW loss 280 to reduce the difference between phoneme durations of the predicted mel-frequency spectrogram sequences 302 and the reference mel-frequency spectrogram sequences 202. By minimizing the final soft-DTW loss 280, the trained TTS model 300 may generate predicted mel-frequency spectrogram sequences 302 that includes the intended prosody/style based on the reference mel-frequency spectrogram sequences 202. Aggregating the spectrogram losses 270a-n may include summing the spectrogram losses 270a-n to obtain the final soft-DTW loss 280. Optionally, aggregating the spectrogram losses 270 may include averaging the spectrogram losses 270.

The deep neural network 200 may be trained so that a number of frames in each respective predicted mel-frequency spectrogram sequence 302 is equal to a number of frames in the reference mel-frequency spectrogram sequence 202 input to the residual encoder 180. Moreover, the deep neural network 200 is trained so that data associated with the reference and predicted mel-frequency spectrogram sequences 202, 302 substantially match one another. The predicted mel-frequency spectrogram sequence 302 may implicitly provide a prosodic/style representation of the reference audio signal 201.

FIG. 3 shows an example of the non-autoregressive TTS model 300 trained by the non-autoregressive deep neural network 200 of FIG. 2. Specifically, FIG. 3 depicts the TTS model 300 using a selected variational embedding 220 to predict a mel-frequency spectrogram sequence 302 for an input text utterance 320, whereby the selected variational embedding 220 represents an intended prosody/style for the text utterance 320. During inference, the trained TTS model 300 executes on the computing system 120 or the user computing device 10 and may use the selected variational embedding 220 to predict the corresponding mel-spectrogram sequence 302 for the input text utterance 320. Here, the TTS model 300 selects a variational embedding 220 from the storage 185 that represents an intended prosody/style for the text utterance 320. In some examples, a user provides a user input indication indicating selection of the intended prosody/style the user wants the resulting synthesized speech 152 to convey for the text utterance 320 and the TTS model 300 selects the appropriate variational embedding 220 from the data storage 185 that represents the intended prosody/style. In these examples, the intended prosody/style may be selected by the user by indicating a speaker identity 205 associated with a particular speaker who speaks with the intended prosody/style and/or specifying a particular prosodic vertical (e.g., newscaster, sportscaster, etc.,) that corresponds to the intended prosody/style. The selected variational embedding 220 may correspond to a prior variational embedding 220 sampled from the VAE-based residual encoder 180. The trained TTS model 300 generates synthesized speech 152, using a synthesizer 155, with the intended prosody/style (e.g., selected variational embedding 220) for the respective input text utterance 320. That is, the selected variational embedding 220 may include an intended prosody/style (e.g., newscaster, sportscaster, etc.) stored on the residual encoder 180. The selected variational embedding 220 conveys the intended prosody/style via synthesized speech 152 for the input text utterance 320.

In additional implementations, the trained TTS model 300 employs the residual encoder 180 during inference to extract/predict a variational embedding 220 on the fly for use in predicting a mel-frequency spectrogram sequence 302 for the input text utterance 320. For instance, the residual encoder 180 may receive a reference audio signal 201 (FIG. 2) uttered by a human user that conveys the intended prosody/style (e.g., "Say it like this") and extract/predict a corresponding variational embedding 220 that represents the intended prosody/style. Thereafter, the trained TTS model 300 may use the variational embedding 220 to effectively transfer the intended prosody/style conveyed by the reference audio signal 201 to the mel-frequency spectrogram sequence 302 predicted for the input text utterance 320. Accordingly, the input text utterance 320 to be synthesized into expressive speech 152 and the reference audio signal 201 conveying the intended prosody/style to be transferred to the expressive speech 152 may include different linguistic content.

In particular, the text encoder 210 encodes a sequence of phonemes extracted from the text utterance 320 into an encoded text sequence 219. The text encoder 210 may receive, from the token embedding look-up table 207, a respective token embedding for each phoneme in the sequence of phonemes extracted from the text utterance 320. After receiving the respective token embedding of each phoneme in the sequence of phonemes extracted from the text utterance 320, the text encoder 210 uses the encoder pre-net neural network 208 to process each respective token embedding to generate a respective transformed embedding 209 of each phoneme. Thereafter, the bank of Conv blocks 212 (e.g., three (3) identical 5×1 Conv blocks) processes the respective transformed embeddings 209 to generate convolution outputs 213. Finally, a stack of self-attention blocks 218 process the convolution outputs 213 to generate the encoded text sequence 219. In the example shown, the stack of self-attention blocks 218 includes six (6) transformer blocks. In other examples, the self-attention blocks 218 may include LConv blocks in lieu of transformer blocks. Notably, since each convolution output 213 flows through the stack of self-attention blocks 218 simultaneously, the stack of self-attention blocks 218 have no knowledge of position/order of each phoneme in the input text utterance. Thus, in some examples, sinusoidal positional embeddings 214 are combined with the convolution output 213 to inject necessary position information indicating the order of each phoneme in the input text sequence 206. In other examples, encoded positional embeddings are used in place of the sinusoidal positional embeddings 214.

With continued reference to FIG. 3, the concatenator 222 concatenates the selected variational embedding 220, the encoded text sequence 219, and optionally, a reference speaker embedding ys to generate the concatenation 224. Here, the reference speaker embedding ys may represent the speaker identity 205 of a reference speaker that uttered one or more reference audio signal 201 associated with the selected variational embedding 220 or the speaker identity 205 of some other reference speaker having voice characteristics to be conveyed in the resulting synthesized speech 152. The duration model network 230 is configured to decode the concatenation 224 of the encoded text sequence 219, the selected variational embedding 220, and the reference speaker embedding ys to generate an upsampled output 258 of the duration model network 230 for predicting a phoneme duration 240 for each phoneme in the sequence of phonemes in the input text utterance 320.

The duration model network 230 is configured to generate the upsampled output 258 that specifies a number of frames for the encoded text sequence 219 from the concatenation 224. In some implementations, the duration model network 230 includes a stack of self-attention blocks 232 followed by two independent small convolution blocks 234, 238 and a projection with a softplus activation 236. In the example shown, the stack of self-attention blocks includes four (4) 3×1 LConv blocks 232. As described above with reference to FIG. 5, each LConv block in the stack of self-attention blocks 232 may include a GLU unit 502, a LConv layer 504, and a FF layer 506 with residual connections. The stack of self-attention blocks 232 generates a sequence representation V based on the concatenation 224 of the encoded text sequence 219, variational embedding 220, and reference speaker embedding ys.

In some implementations, the first convolution block 234 generates an output 235 and the second convolution block 238 generates an output 239 from the sequence representation V The convolution blocks 234, 238 may include a 3×1 Conv block that has a kernel-width of 3 and output dimension of 3. The duration model network 230 includes a projection with a softplus activation 236 to predict a phoneme duration 240 (e.g., $\{d_1, \ldots, d_K\}$) for each phoneme represented by the encoded text sequence 219. Here, the softplus activation 236 receives, as input, the sequence representation V to predict the phoneme durations 240.

The duration model network 230 includes a matrix generator 242 to define token boundaries $[s_k, e_k]_{k=1}^{K}$ from the predicted phoneme durations 240 as described above with reference to FIG. 2. The duration model network 230 includes a first function 244 to learn an interval representation matrix W. In some implementations, the first function 244 includes two (2) projection layers with bias and Swish-activation. In the example shown, both projections of the first function 244 project and output with a dimension of 16 (i.e., P=16). The first function 244 receives a concatenation 237, as input, from the concatenator 222. The concatenator 222 concatenates the output 235 from the convolution block 234 and the grid matrices 243 to generate the concatenation 237. Subsequently, the first function 244 generates the interval representation matrix W (e.g., T×K attention matrix) from a projection with a softplus activation 246 of the output 247 using Equation 6.

The duration model network 230 may learn an auxiliary attention context tensor C (e.g., $C=[C_1, \ldots, C_P]$) using a second function 248 conditioned on the sequence representation V. Here, $C_P$ is a T×K matrix from the auxiliary attention content tensor C. The auxiliary attention context tensor C may include auxiliary multi-headed attention like information for the spectrogram decoder 260. A concatenator 222 concatenates the grid matrices 243 and the output 239 to generate a concatenation 249. The second function 248 may include by two (2) projection layers with bias and Swish-activation. The second function 248 receives, as input, the concatenation 249 to generate the auxiliary attention context tensor C based on the respective grid matrices 243 mapped from the start and end boundaries $s_k, e_k$ and the sequence representation V using Equation 7.

The duration model network 230 may upsample the sequence representation V into the upsampled output 258 (e.g., O $\{o_1, \ldots, o_T\}$) with a number of frames. Here, the number of frames of the upsampled output corresponds to the predicted length of the predicted mel-frequency spectrogram 302 determined by the predicted phoneme duration 240 of the corresponding input text sequence 206. Upsampling the sequence representation V into the upsampled output 258 is based on determining a product 254 of the interval representation Wand the sequence representation V using the multiplier 253, and determining an einsum 256 of the interval representation matrix Wand the auxiliary attention context sensor C using the einsum operator 255. A projection 250 projects the einsum 356 into a projected output 252 that the adder 257 sums with the product 254 to generate the upsampled output 258 represented by Equation 8.

The spectrogram decoder 260 is configured to generate, based on the upsampled output 258 of the duration model network 230 and the predicted phoneme durations 240, a predicted mel-frequency spectrogram sequence 302 for the text utterance 320. Here, the predicted mel-frequency spectrogram sequence 302 has the intended prosody/style specified by the selected variational embedding 220. The predicted mel-frequency spectrogram sequence 302 for the text utterance 320 is based on the auxiliary attention context tensor C, the sequence representation V interval representation w, and the upsampled output 258 of the duration model network 230 into the number of frames.

The spectrogram decoder 260 generates a respective predicted mel-frequency spectrogram sequence 302 as output from the last self-attention block 262 in the stack of self-attention blocks 262a-n. Here, each self-attention block 262 in the stack of self-attention blocks 262 of the spectrogram decoder 260 includes one of an identical LConv block or an identical transformer block. In some examples, the spectrogram decoder 260 includes six (6) eight-headed 17×1 LConv blocks with 0.1 dropout. The output of the last feedforward (FF) layer 506 (FIG. 5) for each self-attention block 262 is provided as input to the subsequent self-attention block 262. That is, the GLU unit 502 (FIG. 5) and the LConv layer 504 (FIG. 5) of the first self-attention block 262a in the stack of self-attention blocks 262a-n processes the output 238 from the duration model network 230 and the predicted phoneme durations 240 and output from the last FF layer 506 of the first self-attention block 262a is provided as input to the subsequent second self-attention block 262b in the stack of self-attention blocks 262. The output of the last FF layer of each self-attention block 262 is provided as input to the subsequent self-attention block 262 until the last self-attention block 262n in the stack of self-attention blocks 262 is reached. The last self-attention block 262n (e.g., the sixth self-attention block 262) in the stack of self-attention blocks 262 is paired with a corresponding projection layer 264 that projects an output 263 from the last self-attention block 262 to generate the respective predicted mel-frequency spectrogram sequence 302.

The predicted mel-frequency spectrogram sequence 302 generated by the spectrogram decoder 260 corresponds to the input text utterance 320 and conveys the intended prosody/style indicated by the selected variational embedding 220. The trained TTS model 300 provides the predicted mel-frequency spectrogram sequence 302 for the input text utterance 320 to the synthesizer 155 for conversion into a time-domain audio waveform indicative of synthesized speech 152. The synthesized speech 152 may be audibly output as spoken representation of the input text utterance 320 including the intended prosody/style as indicated by the selected variational embedding 220.

Figure 6:
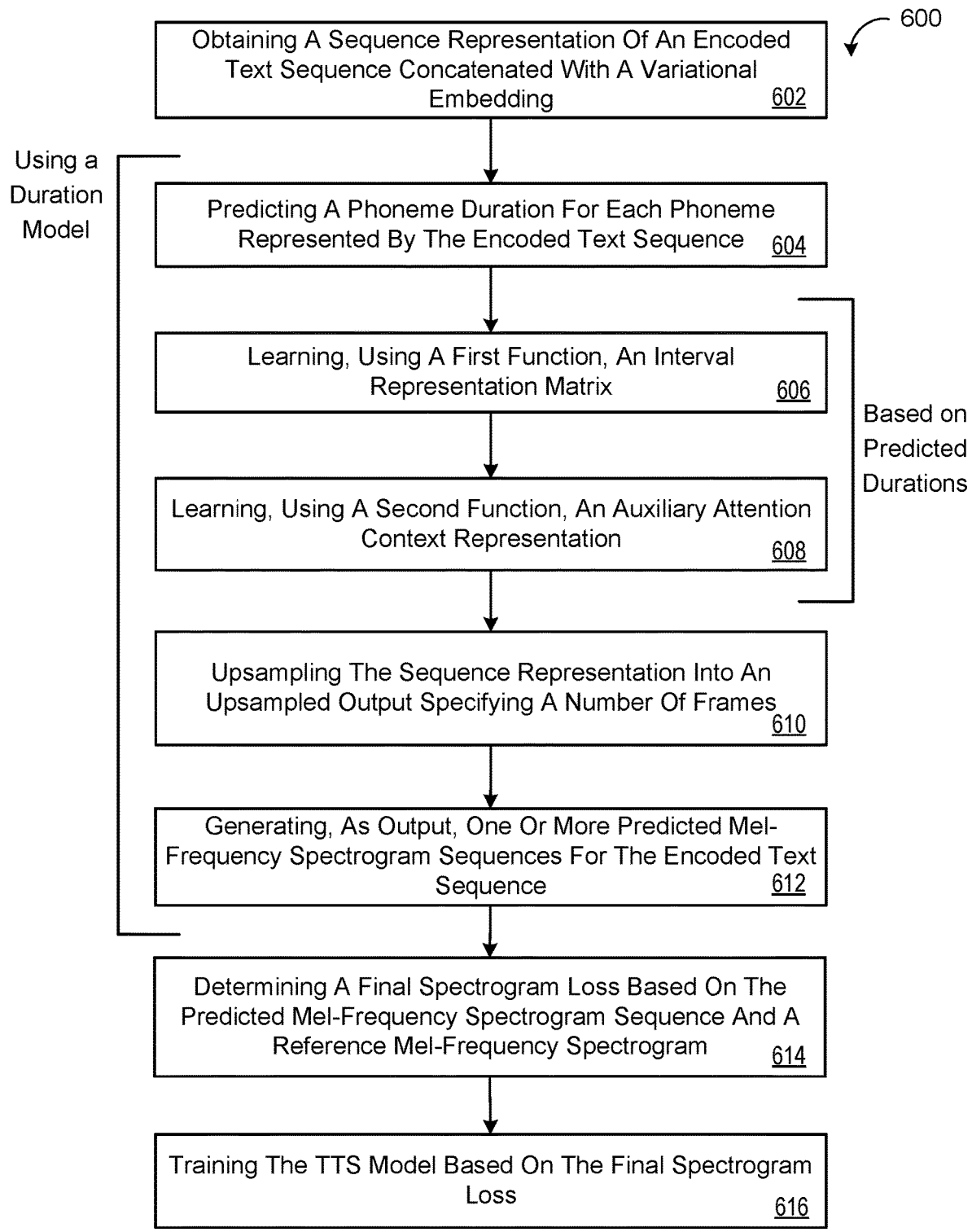
FIG. 6 is a flowchart of an exemplary arrangement of operations for a computer-implemented method for training a non-autoregressive text-to-speech model.

FIG. 6 is a flowchart of an exemplary arrangement of operations for a computer-implemented method 600 for training a non-autoregressive text-to-speech (TTS) model. At operation 602, the method 600 includes obtaining a sequence representation V of an encoded text sequence 219 concatenated with a variational embedding 220. At operation 604, using a duration model network the method 600 includes predicting, based on the sequence representation V, a phoneme duration 240 for each phoneme represented by the encoded text sequence 219. Based on the predicted phoneme durations 240, the method 600 includes, at operation 606, learning, using a first function 244 conditioned on the sequence representation V, an interval representation matrix W. At operation 608, the method 600 includes learning, using a second function 248 conditioned on the sequence representation V, an auxiliary attention context representation C.

At operation 610, the method 600 includes upsampling, using the interval representation matrix W and the auxiliary attention context representation C, the sequence representation V into an upsampled output 258 specifying a number of frames. At operation 612, the method 600 includes generating, as output from a spectrogram decoder 260 that includes a stack of one or more self-attention blocks 262, 262a-n, based on the upsampled output 258, one or more predicted mel-frequency spectrogram sequences 302 for the encoded text sequence 219. At operation 614, the method 600 includes determining a final spectrogram loss 280 based on the one or more predicted mel-frequency spectrogram sequences 302 and a reference mel-frequency spectrogram sequence 202. At operation 616, the method 600 includes training the TTS model 300 based on the final spectrogram loss 280.

Figure 7:
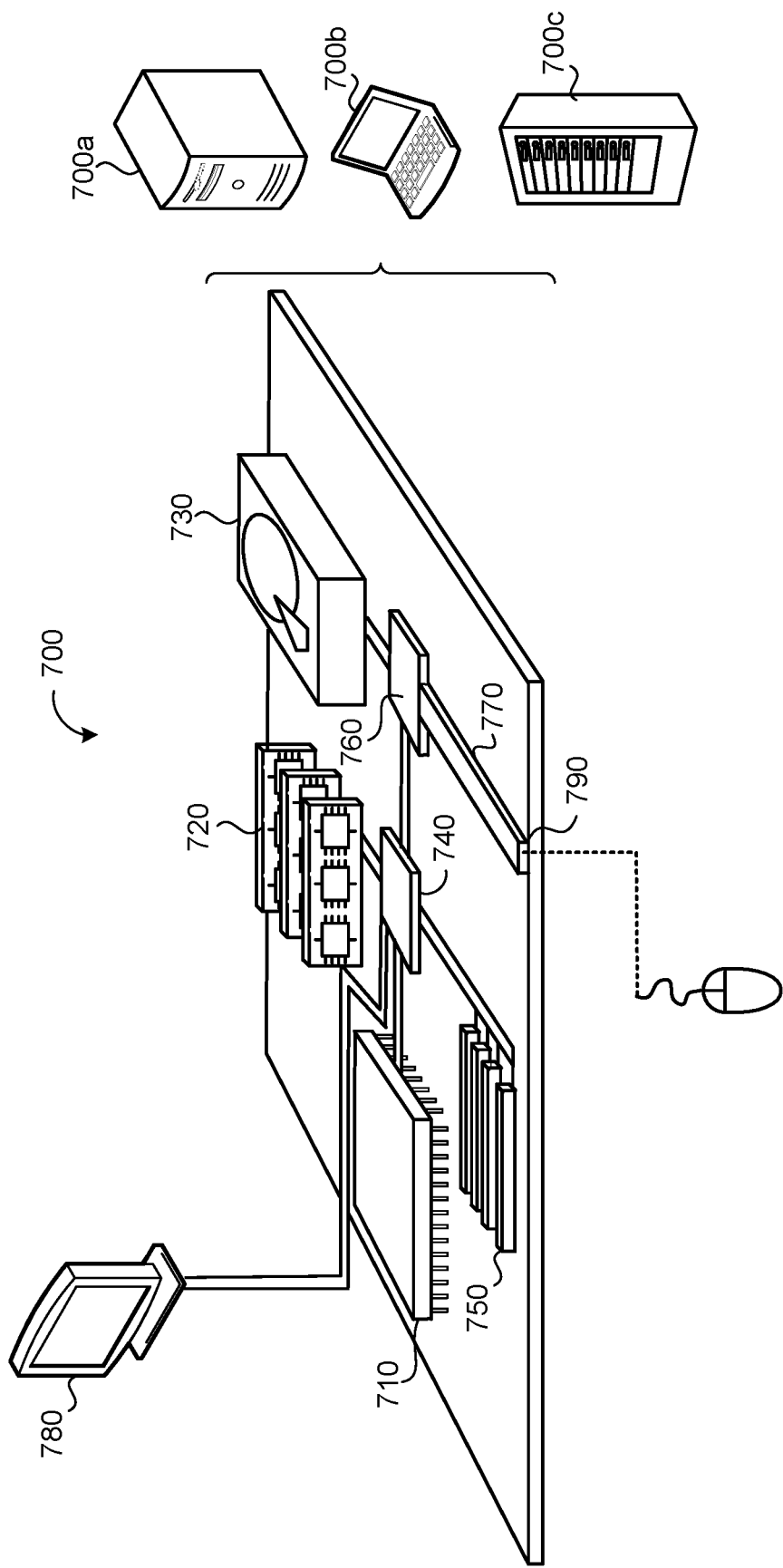
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations for training a non-autoregressive text-to-speech (TTS) model, the operations comprising:
   obtaining a sequence representation of an encoded text sequence concatenated with a variational embedding;
   using a duration model network:
      predicting, based on the sequence representation, a phoneme duration for each phoneme represented by the encoded text sequence;
      based on the predicted phoneme durations, generating, for each phoneme represented by the encoded text sequence, respective start and end boundaries;
      mapping, based on a number of phonemes represented by the encoded text sequence and a number of reference frames in a reference mel-frequency spectrogram sequence, the respective start and end boundaries generated for each phoneme into respective grid matrices;
      based on the respective grid matrices mapped from the start and end boundaries, learning, using a first function conditioned on the sequence representation, an interval representation matrix;
      determining a product of the interval representation matrix and the sequence representation; and
      upsampling, based on the product of the interval representation matrix and the sequence representation, the sequence representation into an upsampled output specifying a number of frames;
   generating, as output from a spectrogram decoder comprising a stack of one or more self-attention blocks, based on the upsampled output, one or more predicted mel-frequency spectrogram sequences for the encoded text sequence;
   determining a final spectrogram loss based on the one or more predicted mel-frequency spectrogram sequences and the reference mel-frequency spectrogram sequence; and
   training the TTS model based on the final spectrogram loss.

2. The computer-implemented method of claim 1, wherein the first function comprises a respective multi-layer perception-based learnable function.

3. The computer-implemented method of claim 1, wherein the operations further comprise:
   determining a global phoneme duration loss based on the predicted phoneme durations and an average phoneme duration,
   wherein training the TTS model is further based on the global phoneme duration loss.

4. The computer implemented method of claim 3, wherein training the TTS model based on the final spectrogram loss and the global phoneme duration loss comprises training the duration model network to predict the phoneme duration for each phoneme without using supervised phoneme duration labels extracted from an external aligner.

5. The computer-implemented method of claim 1, wherein the operations further comprise:

receiving training data including a reference audio signal and a corresponding input text sequence, the reference audio signal comprising a spoken utterance and the input text sequence corresponds to a transcript of the reference audio signal;

encoding, using a residual encoder, the reference audio signal into a variational embedding, the variational embedding disentangling style/prosody information from the reference audio signal; and encoding, using a text encoder, the input text sequence into the encoded text sequence.

6. The computer-implemented method of claim 5, wherein:

the residual encoder comprises a global variational autoencoder (VAE); and encoding the reference audio signal into the variational embedding comprises:

sampling the reference mel-frequency spectrogram sequence from the reference audio signal; and encoding, using the global VAE, the reference mel-frequency spectrogram sequence into the variational embedding.

7. The computer-implemented method of claim 5, wherein:

the residual encoder comprises a phoneme-level fine-grained variational autoencoder (VAE); and encoding the reference audio signal into the variational embedding comprises:

sampling the reference mel-frequency spectrogram sequence from the reference audio signal;

aligning the reference mel-frequency spectrogram sequence with each phoneme in a sequence of phonemes extracted from the input text sequence; and encoding, using the phoneme-level fine-grained VAE, based on aligning the reference mel-frequency spectrogram sequence with each phoneme in the sequence of phonemes, a sequence of phoneme-level variational embeddings.

8. The computer-implemented method of claim 5, wherein the residual encoder comprises a stack of lightweight convolution (LConv) blocks, each LConv block in the stack of LConv blocks comprises:

a gated linear unit (GLU) layer;

a LConv layer configured to receive an output of the GLU layer;

a residual connection configured to concatenate an output of the LConv layer with an input to the GLU layer; and a final feedforward layer configured to receive, as input, the residual connection concatenating the output of the LConv layer with the input to the GLU layer.

9. The computer-implemented method of claim 5, wherein the operations further comprise:

concatenating the encoded text sequence, the variational embedding, and a reference speaker embedding representing an identity of a reference speaker that uttered the reference audio signal; and generating the sequence representation based on the duration modeling network receiving, as input, the concatenation of the encoded text sequence, the variational embedding, and the reference speaker embedding.

10. The computer-implemented method of claim 5, wherein:

the input text sequence includes a sequence of phonemes; and encoding the input text sequence into the encoded text sequence comprises:

receiving, from a phoneme look-up table, a respective embedding of each phoneme in the sequence of phonemes;

for each phoneme in the sequence of phonemes, processing, using an encoder pre-net neural network of the text encoder, the respective embedding to generate a respective transformed embedding of the phoneme;

processing, using a bank of convolutional blocks, the respective transformed embeddings to generate convolution outputs; and processing, using a stack of self-attention blocks, the convolution outputs to generate the encoded text sequence.

11. A system for training a non-autoregressive text-to-speech (TTS) model, the system comprising:

data processing hardware; and memory hardware in communication with the data processing hardware, the memory hardware storing instructions that when executed by the data processing hardware cause the data processing hardware to perform operations comprising:

obtaining a sequence representation of an encoded text sequence concatenated with a variational embedding;

using a duration model network:

predicting, based on the sequence representation, a phoneme duration for each phoneme represented by the encoded text sequence;

based on the predicted phoneme durations, generating, for each phoneme represented by the encoded text sequence, respective start and end boundaries;

mapping, based on a number of phonemes represented by the encoded text sequence and a number of reference frames in a reference mel-frequency spectrogram sequence, the respective start and end boundaries generated for each phoneme into respective grid matrices;

based on the respective grid matrices mapped from the start and end boundaries, learning, using a first function conditioned on the sequence representation, an interval representation matrix;

determining a product of the interval representation matrix and the sequence representation; and upsampling, based on the product of the interval representation matrix and the sequence representation, the sequence representation into an upsampled output specifying a number of frames;

generating, as output from a spectrogram decoder comprising a stack of one or more self-attention blocks, based on the upsampled output, one or more predicted mel-frequency spectrogram sequences for the encoded text sequence;

determining a final spectrogram loss based on the one or more predicted mel-frequency spectrogram sequences and the reference mel-frequency spectrogram sequence; and training the TTS model based on the final spectrogram loss.

12. The system of claim 11, wherein the first function comprises a respective multi-layer perception-based learnable function.

13. The system of claim 11, wherein the operations further comprise:

determining a global phoneme duration loss based on the predicted phoneme durations and an average phoneme duration, wherein training the TTS model is further based on the global phoneme duration loss.

14. The system of claim 13, wherein training the TTS model based on the final spectrogram loss and the global phoneme duration loss comprises training the duration model network to predict the phoneme duration for each phoneme without using supervised phoneme duration labels extracted from an external aligner.

15. The system of claim 11, wherein the operations further comprise:
receiving training data including a reference audio signal and a corresponding input text sequence, the reference audio signal comprising a spoken utterance and the input text sequence corresponds to a transcript of the reference audio signal;
encoding, using a residual encoder, the reference audio signal into a variational embedding, the variational embedding disentangling style/prosody information from the reference audio signal; and
encoding, using a text encoder, the input text sequence into the encoded text sequence.

16. The system of claim 15, wherein:
the residual encoder comprises a global variational autoencoder (VAE); and
encoding the reference audio signal into the variational embedding comprises:
sampling the reference mel-frequency spectrogram sequence from the reference audio signal; and
encoding, using the global VAE, the reference mel-frequency spectrogram sequence into the variational embedding.

17. The system of claim 15, wherein:
the residual encoder comprises a phoneme-level fine-grained variational autoencoder (VAE); and
encoding the reference audio signal into the variational embedding comprises:
sampling the reference mel-frequency spectrogram sequence from the reference audio signal;
aligning the reference mel-frequency spectrogram sequence with each phoneme in a sequence of phonemes extracted from the input text sequence; and
encoding, using the phoneme-level fine-grained VAE, based on aligning the reference mel-frequency spectrogram sequence with each phoneme in the sequence of phonemes, a sequence of phoneme-level variational embeddings.

18. The system of claim 15, wherein the residual encoder comprises a stack of lightweight convolution (LConv) blocks, each LConv block in the stack of LConv blocks comprises:
a gated linear unit (GLU) layer;
a LConv layer configured to receive an output of the GLU layer;
a residual connection configured to concatenate an output of the LConv layer with an input to the GLU layer; and
a final feedforward layer configured to receive, as input, the residual connection concatenating the output of the LConv layer with the input to the GLU layer.

19. The system of claim 15, wherein the operations further comprise:
concatenating the encoded text sequence, the variational embedding, and a reference speaker embedding representing an identity of a reference speaker that uttered the reference audio signal; and
generating the sequence representation based on the duration modeling network receiving, as input, the concatenation of the encoded text sequence, the variational embedding, and the reference speaker embedding.

20. The system of claim 15, wherein:
the input text sequence includes a sequence of phonemes; and
encoding the input text sequence into the encoded text sequence comprises:
receiving, from a phoneme look-up table, a respective embedding of each phoneme in the sequence of phonemes;
for each phoneme in the sequence of phonemes, processing, using an encoder pre-net neural network of the text encoder, the respective embedding to generate a respective transformed embedding of the phoneme;
processing, using a bank of convolutional blocks, the respective transformed embeddings to generate convolution outputs; and
processing, using a stack of self-attention blocks, the convolution outputs to generate the encoded text sequence.

* * * * *